Dec. 13, 1960  J. FAFA ET AL  2,964,583
DEFERRED-ACTION BATTERY ENERGIZED BY IMMERSION IN A LIQUID
Filed June 9, 1958  4 Sheets-Sheet 4

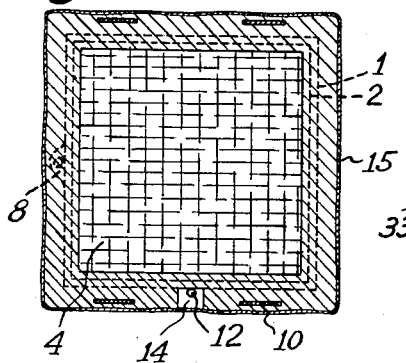
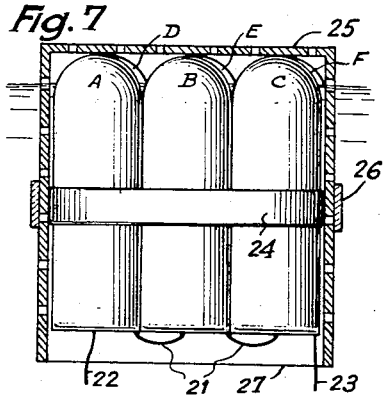
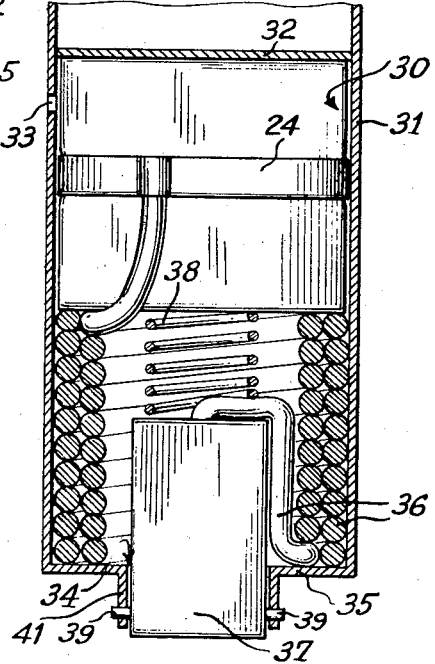

United States Patent Office 2,964,583
Patented Dec. 13, 1960

2,964,583

DEFERRED-ACTION BATTERY ENERGIZED BY IMMERSION IN A LIQUID

Jean Fafa and Raymond Vic, Paris, France, assignors to Compagnie Industrielle des Piles Electriques Cipel, Neuilly, France, a corporation of France Filed June 9, 1958, Ser. No. 740,719

Claims priority, application France June 7, 1957

7 Claims. (Cl. 136—91)

This invention relates to deferred-action batteries of the type that are energized by immersion in an activating liquid.

Such deferred-action batteries are adapted to be stored for long periods of time without their capacity being affected by prolonged storage as would be the case with dry cell batteries. Such batteries essentially comprise a pair of electrodes and a separator of absorbent material between the electrodes, so that the battery is only energized after immersion into an activating liquid which is absorbed in the absorbent separator. The activating liquid may be an electrolyte liquid or it may be water in which case the separator must itself contain the solid ingredients of an operative electrolyte. After immersion the battery should of course be withdrawn from the liquid if it is to put out its maximum capacity since otherwise the liquid would to some extent at least short-circuit the electrodes of the battery.

It is seen therefore that, owing to their operating principle, deferred-action batteries require the intervention of a human operator if only to remove the battery from the bath of activating liquid, and this necessity has heretofore considerably restricted the range of applicability of such batteries. Thus, in cases where electrically powered apparatus is to be dropped by parachute into the ocean and thereafter left to its own resources, and where the operation of the apparatus must only commence after immersion, conventional types of deferred-action batteries cannot be used. Whereas the immersion phase per se does not pose any problem in the instance under consideration since, on touching the surface, water will penetrate into the absorbent separator medium and thereby energize the battery, there is no simple and practical way of withdrawing the battery out of the water after activation. Hence, aside from short-circuits between the individual cells of the battery as mentioned above, the operation of the battery will be impaired by inevitable electrolysis of the sea-water between the elements or the terminals of the battery. Such electrolysis will result in a substantial drop in the energy output capacity of the battery.

While this difficulty could frequently be overlooked in connection with low-voltage deferred-action batteries, this is no longer the case with batteries having a voltage output in the range of, say 150 or 200 volts. In such cases the electrolysis will proceed with great violence and a considerable drop in voltage will occur.

Various expedients have been suggested for overcoming the difficulty and for withdrawing the battery from the activating medium on complete impregnation by said medium of all separator elements interposed between the battery electrodes. All such prior systems are generally based on a common principle involving insertion of the battery into an envelope or hood formed with an aperture. The assembly is so weighted with ballast that, on immersion, the aperture in the hood will be positioned below the lowermost element of the battery. By the use of any of various ependients, some of which will be briefly referred to below, liquid is then caused to penetrate into the hood and, from the instant when the battery is immersed, the hood is sealed against the flow of gases and liquids throughout all its parts positioned above the opening. The liquid is then expelled out of the hood by the action of the increasing volume of a gas generated inside the hood and building up pressure in the top of the hood to force the liquid to the bottom. The gas may be generated artificially, for example, by means of tablets of sodium bicarbonate or the like, or by means of some other gas-generating substance accessible to the activating liquid as the latter reaches the upper end of the battery, or the gas may be generated naturally, both by the gaseous products of the electrolysis between the elements or terminals of the battery while immersed, and by the gases that may be further generated during the subsequent operation of the battery.

The various types of batteries of this class as heretofore proposed differ mainly in the means used therein during the initial phase of total immersion for allowing the liquid to enter the hood. Thus, it should be noted that, in cases where the hood used is sealed in its upper part rather than being provided with an upper vent or vents the only way to ensure that liquid will penetrate into the hood is to create a vacuum inside the hood, the bottom opening being only opened at the time of immersion, or else by causing the weighted hood to sink to a considerable depth. If on the other hand the hood is vented at its top it is necessary for the vent to be sealed after complete immersion of the battery for preventing the escape of the generated gas through the vent.

All such prior systems have a number of drawbacks. Systems involving vent valves, in addition to being mechanically complicated, are unreliable in operation, as the means used to ensure closure of the vent valve as soon as water has reached the top of the casing, are liable to be damaged especially after prolonged storage and/or may be accidentally actuated in storage or transportation.

Those systems involving immersion to a considerable depth are substantially complicated by the presence of a weighting mechanism and are unreliable because the gas pressure within the hood simultaneously triggers off the evolution of gas in the battery. In such circumstances there is no certainty that the uppermost element of the battery will be effectively immersed in the liquid prior to expulsion of the latter by the gas.

It is a general object of this invention to provide a deferred-action battery which will be free of the drawbacks of prior systems as summarized above, and specific objects of the present invention include the provision of such a battery wherein:

The battery casing or hood is sealed throughout all of its parts above the lower opening thereof, thereby removing all prior difficulties such as complicated construction, unreliable operation, and the danger of unwanted actuation of a vent controlling mechanism.

The battery cells are wholly immersed practically instantaneously, so that the evolution of gas as a result of the natural operation of the elements and/or electrolysis will only occur after the entire battery has been thus immersed. This removes the risk of the evolved gas interfering with the penetration of the liquid into the casing or hood.

Full immersion of the cells or elements of the battery is ensured prior to expulsion of the liquid.

Each battery is a completely autonomous unit free of any external ancillary attachment; such as floats and attached cables and release mechanism, as are employed with prior batteries that have to be immersed below the level of the liquid.

Each battery unit behaves as an independent buoyant float.

With the above objects in view, the invention provides a battery contained in an envelope or hood open only at a point below the battery, when the unit is sunk in the water, and means are provided in the upper part of the hood whereby the internal volume of the hood above the battery is increased after the unit as a whole has been sunk. When a sufficient degree of increase in volume is thus effected, the relatively light gases entrapped within the hood rise into the upper part of the hood and the battery is entirely submerged in the body of the liquid which now occupies the volume initially occupied by the gas. Such liquid is thereafter expelled by the gases generated in the battery as in certain conventional types of automatic deferred-action batteries, referred to above.

A clearer understanding of the invention will be had from the ensuing description made with reference to the accompanying drawings, wherein:

Fig. 3 is a section on line III—III of Fig. 1;

Fig. 7 shows a set of batteries within a container;

Fig. 8 shows another arrangement for a set of batteries within a container; and

Fig. 9 is a side view of the lower part of the container in Fig. 8.

Figure 1:
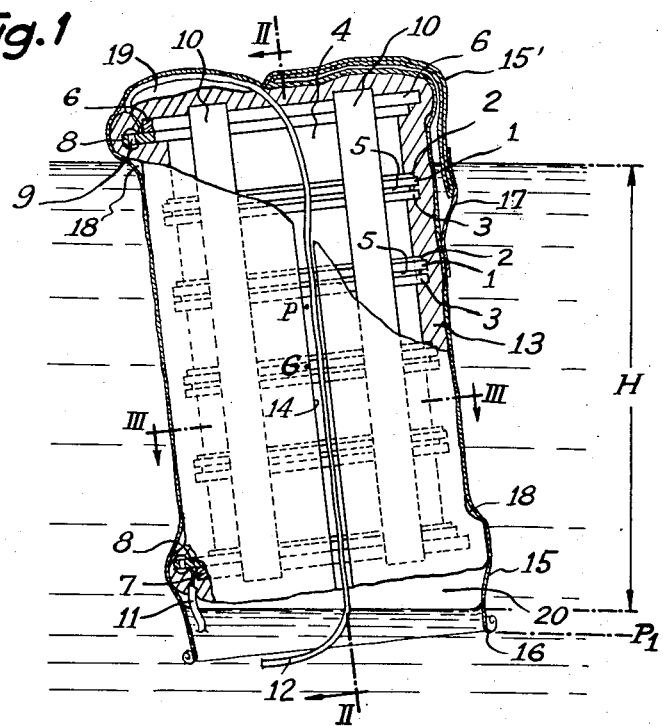
Fig. 1 is a side view of a stack of deferred-action battery cells contained in a hood according to the invention, with the elements surrounding the stack of cells being shown partly broken away.
Figure 2:
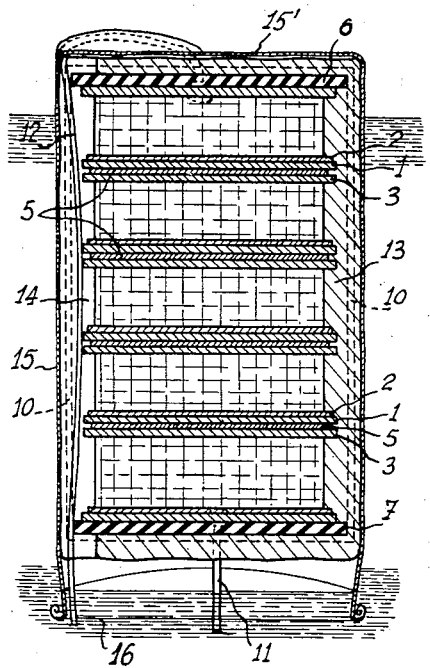
Fig. 2 is a section on line II—II of Fig. 1.

Referring to the drawings in detail and particularly to Fig. 2, it will be seen that each battery, or stack of cells, comprises a plurality of generally flat cells or elements in stacked relation. Each flat cell comprises a postive electrode 1 in the form of a copper plate which may be 28 mm. by 28 mm. and 0.2 mm. thick, coated with a cuprous chloride layer 2 which may weigh 0.9 gram, and a negative electrode 3 made of magnesium and which may be 0.6 mm. thick. The two electrodes of each cell are separated by a body 4 of absorbent material, which may, for example, comprise thirty-two sheets of cellulose of the type known as Afnor VII/I. The opposite electrodes of the adjacent cells or elements are interconnected by a strip 5 of plastic material rendered conductive by incorporation of graphite in its composition. This strip prevents corrosion as would otherwise set in within the contact area between copper and magnesium and improves the electrical contact between adjacent electrodes due to the flexibility of the strip. At both ends of the stack there are provided insulating strips 6 and 7, while the end electrodes are extended as at 8 (Figs. 1 and 3) and are provided with rivets forming the terminals of the stack of cells. The individual cells are held together by a pair of bands 10. Leads 11 and 12 serve to take off current from the battery. The stack thus provided is 85 mm. in vertical length and is coated with a 2 mm. deep coating of pitch 13. The spots of solder at the ends of the wires or leads 11 and 12 are coated with fused pitch so as to provide full insulation for all electrical connections. However, a cutout or groove 14 is provided in the pitch coating whereby the side surfaces of the constituent elements, including the cellulose sheets 4, are laid bare over a width of about 4 mm. The wire conductor 12 is inserted into the groove 14 (Fig. 1).

The stack of cells is inserted, with its positive terminal end foremost, into a hood 15 made of rubber latex and which may have a diameter of 28 mm. and a length of 140 mm. when in unstretched condition. The stack is not pushed fully home into the hood, but rather, the lower end of the stack which carriers the negative terminal is spaced a distance, for example, about 5 mm., from the end opening 16 of the hood 15, thus leaving a substantial empty space at the closed upper end of the hood.

With this arrangement, the hood is tightly applied against the sides of the stack and the end wall 15' of the hood 15 forms a slack pocket. This pocket is folded over so that the residual volume defined between the upper end face of the stack and the folded end of the hood is negligibly small. The end wall 15' is retained in folded-over condition by a strip of paper 17 adhesively bonded to the end wall 15' and to the side wall of the hood 15 by means of a suitable water-soluble adhesive substance such as, for example, polyvinyl alcohol, gum arabic, dextrin, or the like.

When the resulting assembly is dipped into a large-capacity tank containing 2.7 kilograms NaCl and 0.4 kg. $MgCl_2$ in 100 liters water, i.e. a composition substantially similar to that of sea water, as in Fig. 1, the battery unit sinks partially and is oriented in a vertical attitude, with the opening 16 below the first cell of the stack, by reason of the fact that the center of gravity G of the assembly is positioned on the same side as opening 16 with respect to the center of hydrostatic pressure P.

At this time the hood 15 contains a certain volume of air $V_0$ which includes:

The air in any small spaces such as 18 remaining between hood 15 and the stack of cells;

Occluded air within the cellulose separators 4;

Any residual air volume 19 remaining within the folds of the end pocket 15'; and The volume 20 remaining under the lower face of the stack of cells as shown in Figs. 1 and 2.

Provided the air volume $V_0$ as reduced to its effective value $V_0'$ at the particular hydrostatic pressure corresponding to the depth H in Fig. 1 exceeds a predetermined value, the unit will be buoyant and float as shown in the drawing.

It will be noted that the air volume $V_0$ is evaluated as the volume above the horizontal plane $P_1$ through the uppermost point of the opening 16. Such a plane is fixed with respect to the system of points G—P, since it is a plane normal to the line joining the points G and P.

When the battery is partly submerged as in Fig. 1, the liquid acts rapidly to dissolve the soluble adhesive, and/or softens the paper 17. The folded end 15' of hood 15 is thereby released and, by the effect of the hydrostatic pressure head H (Figs. 1 and 2) the air occupying the volume $V_0'$ as identified above rises by buoyancy and results in a near-instantaneous expansion of the end portion 15'. The liquid therefore rises (as represented by the arrows $F_1$ in Fig. 4) by way of the groove 14 (Figs. 1 and 2) until the stack of elements is fully submerged, a condition which will occur if the capacity of end portion 15' when expanded is large enough to receive all of the body of air which initially occupied the volume $V_0$, as will be more fully described hereinafter. The air occupying any gaps such as 18 is instantly expelled towards the top of the hood due to the provision of the groove 14, and the liquid seeps (as at $F_2$) into the cellulose separators 4 from the longitudinal groove 14, while occluded air in the separators escapes therefrom in the form of bubbles which rise up towards the upper gas pocket as indicated at $f$. During this near-instantaneous filling process, there is materially no time for any gas evolved from the battery to oppose the rise of the water in the hood. It will be noted in this connection that, on expansion of the end pocket 15', the liquid primarily expels the gas occupying the spaces 18, 19 and 20, in an upward direction, whereas occluded air from the separators 4 is expelled at a more gradual rate. The liquid level therefore rises inside the casing up to a higher level than the theoretical level and subsequently drops gradually as the occluded air in the separators adds to the upper gas pocket. This process greatly increases the reliability of operation as regards the certainty of the topmost cell of the battery being effectively submerged.

It will be noted that the certainty of the stack being fully submerged is achieved when the liquid level reaches the level of the plane $p_2$ inside the hood 15. Such a plane can easily be determined since it also is normal to the line through the points G and P, and it extends through the point of the stack furthest removed from G and is positioned on the other side of the center of hydrostatic pressure from the center of gravity.

Figure 4:
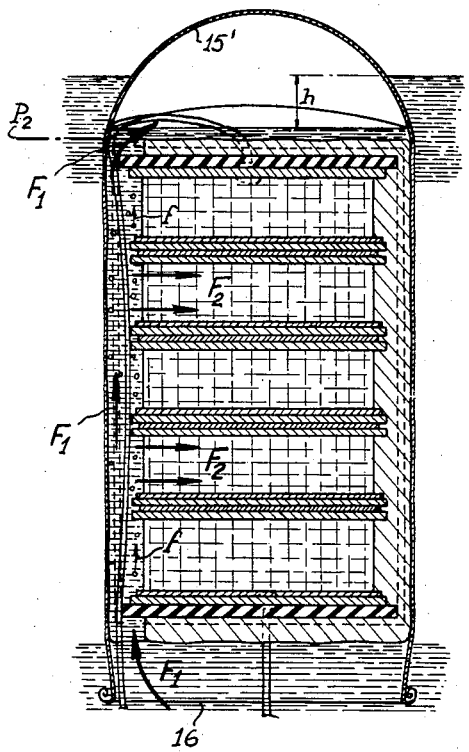
Fig. 4 is a section similar to Fig. 2 but showing the immersed unit at the time when activating liquid is penetrating into the hood.

It will be noted finally that the volume $V_0'$ occupied by air at the hydrostatic pressure $P_H$ in the case of Figs. 1 and 2, fills a larger volume $V_0''$ in the top of the hood 15 in the condition shown in Fig. 4, since it is at a lower hydrostatic pressure $P_h$. Clearly the difference between hydrostatic pressures $P_h$ and $P_H$ corresponds to, or balances, the weight of the body of water displaced by the submerged solid parts in the condition of Fig. 4. It is sufficient therefore, that the expansion of the end portion 15' should impart to the hood 15 a volume increase equal to $$\frac{V_0}{1+P_h}$$

where $P_h$ is expressed in atmospheres and wherein $V_0$ designates the volume of gas contained in the casing 15 between the two planes $p_1$ and $p_2$ prior to immersion. Actually $P_h$ is small in the case of the drawings and it can be assumed as a first approximation that all that is required is for the expansion of the end part 15' to cause a volume increase equal to $V_0$, in order to ensure that the topmost cell of the battery is in submerged condition within the casing.

In the case of batteries sunk to comparatively great depths or where the volume $V_0$ is comparatively small, it is found that the requisite increase in volume of the end portion 15' of the hood 15 is quite small, and is in fact consistent with the increase in volume that can be provided by the expansion of an elastic diaphragm. In such cases the hood portion 15' need simply be provided in the form of an elastic diaphragm and the hydrostatic pressure on full submersion of the unit should be sufficiently high. Depending on the value of the volume $V_0$ the battery will be completely immersed in liquid within the hood either before the unit as a whole is submerged, or only after the unit has sunk to a certain depth.

Figure 5:
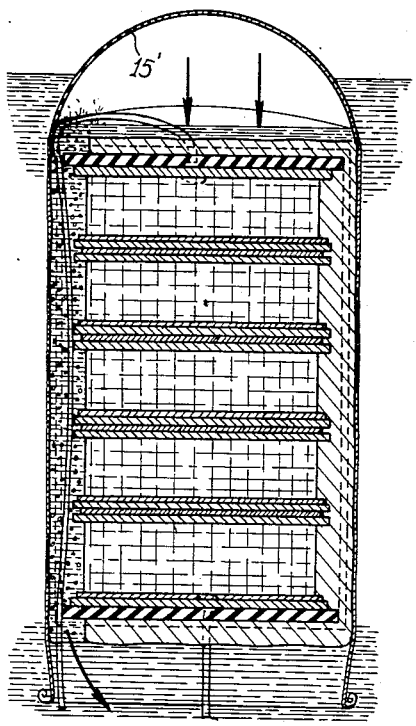
Fig. 5 is a section similar to Figs. 2 and 4, but showing the immersed unit during expulsion of the activating liquid.
Figure 6:
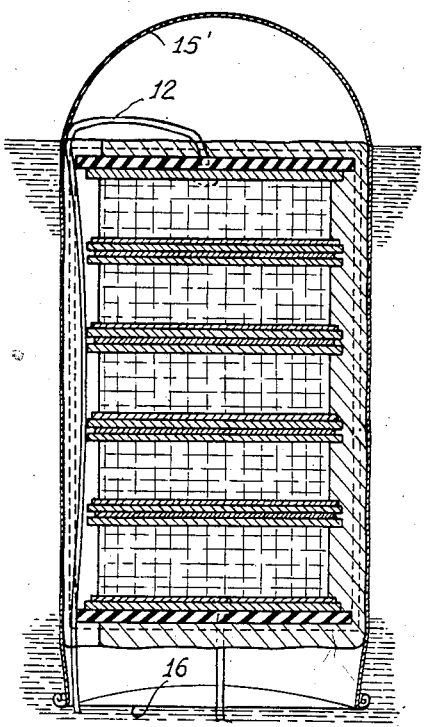
Fig. 6 is a section similar to Figs. 2, 4, and 5, but showing the generator unit in operating condition.

At the stage of use shown in Fig. 4, the cells start to operate and the electrolysis gases, together with some gases evolved in the operation of the battery, begin to form. The resulting bubbles rise into the upper gas pocket. The liquid level drops within the hood 15 (Fig. 5). After said level has dropped, as shown in Fig. 6, to that of the plane $p_1$ indicated in Fig. 1, the stack is surrounded by an exclusively gaseous medium and the battery is in condition for proper operation.

It will be observed that the battery unit per se constitutes a highly buoyant float, since the hood contains a volume of gas substantially equal to $2V_0$, whereas comparable batteries of conventional type as heretofore only contain a gas volume of $V_0$ in operation.

Moreover, the use of a folded hood as described imparts to the assembly a fully tightly sealed condition together with great simplicity of manufacture and assembly, as well as a neat compact and rugged outer condition.

In practice six stacks of cells similar to the stack described may desirably be used, as indicated at A, B, C, D, E and F (Fig. 7). The terminals of the respective stacks are interconnected in series by insulated wires 21. The end wires 22 and 23 are connected with the apparatus to be energized by the battery.

The stacks each inserted in their respective hoods are juxtaposed side by side as shown in Fig. 7 and assembled by a pair of straps 24 consisting e.g. of cellulose tape. The resulting assembly is disposed within a perforate container 25 which is weighted towards the opening 16 in the hoods 15. A strap 26 maintains the stacks in a position such that their bottom ends are spaced by only about 10 mm. above the lower edge 27 of the container so as to permit a subsequent expansion of the ends of the hoods. On operation of the individual stacks shown in Fig. 7, that is, when each stack is in the condition shown in Fig. 4, the output voltage is 95 volts. About 45 seconds after the initial reading the voltage is found to have risen to 143 volts, and thereafter the output voltage rises slowly up to 175 volts, as is conventional with cuprous chloridemagnesium batteries.

The set of batteries just described by way of example delivers an output voltage in the range from 143 to 177 volts across an output resistance of 3000 ohms for a period of 3 hours.

It is contemplated in an alternative embodiment of the invention that the paper strip means 17 for releasing the hood ends 15' may be dispensed with an inertia means, of a type that may be conventional per se, used instead. Such a modification is shown in Figs. 8 and 9 in conjunction with an independent marine recording apparatus shown by way of one example of apparatus to be powered by the novel battery. The stacks of cells bonded by the straps 24 are housed within a chamber 30 of the container 31 after the folded hood ends 15' are crushed against the bulkhead 32. A laterally positioned vent 33 permits liquid to enter through the aperture 34 formed in the bottom wall 35 of the chamber. A cable 36 anchored to the straps 24 and supporting a receiver or pick-up unit 37 is coiled within the chamber 30 under the stacks and a spring 38 is provided for urging the stacks and the unit 37 away from each other. The unit 37 is retained by pins 39 projecting into notches 40 formed in a cylindrical flange 41 projecting down from the bottom wall 35.

The notches 40 are so shaped that the unit 37 will be expelled by the spring 38 as soon as the impact of the water has displaced the pins 39 to the position 39' shown in Fig. 9. The cable then uncoils progressively as the unit sinks and the batteries therein are lowered down into the bottom of the chamber, thereby simultaneously causing expansion of the end portions 15'. If desired, expansion of the portions 15' may be achieved without the use of hydrostatic pressure, by bonding the ends of the portions 15' to the wall 32.

It will be evident that various other modifications may be introduced in addition to those just described and that the invention is not to be limited in its scope otherwise than as required by the ensuing claims. Neither is the scope of the invention to be affected by any part of the description referring to gas volumes, hydrostatic pressures, disposition of certain specified planes, dimensions and the like data, indicated herein for the purpose of providing a clearer understanding of the invention but not for defining the scope thereof.

What we claim is:

1. In a deferred-action battery assembly, a plurality of cells adapted to be energized on wetting with a liquid, and an envelope of flexible waterproof material surrounding said plurality of cells and having an open bottom end and a permanently sealed upper end, said envelope defining a slack expansible portion adjacent said sealed upper end thereof adapted to be expanded and thereby increase the internal volume of said envelope by the action of hydrostatic pressure on the air trapped in said envelope on immersion of said assembly in a body of liquid so that the air trapped in said envelope can be accommodated in the expanded slack portion to allow said liquid to rise rapidly in the envelope to wet and energize all of said cells.

2. In a deferred-action battery assembly, a plurality of cells adapted to be energized on wetting with a liquid, a casing surrounding said cells and having an opening in its lower end to allow said liquid to have access to said cells, and expansible means at the opposite end of said casing adapted for expansion by the action of hydrostatic pressure on air trapped in said casing on immersion of the assembly in liquid to increase the internal volume of the casing so that the air trapped in the casing can be accommodated at said opposite end to allow said liquid to rise up rapidly from said opening toward said opposite end for wetting and energizing all of said cells.

3. In a deferred-action battery assembly, a plurality of cells adapted to be energized on wetting and discharging a gas when thus energized, a casing surrounding said cells and having its lower end and expansible means at the opposite end of the casing adapted for expansion by the action of hydrostatic pressure on air trapped in said casing upon immersion of the assembly in a body of liquid to increase the internal volume of the casing so that the air trapped in said casing can be accommodated at said opposite end to allow said liquid to rise rapidly in said casing from said opening up to a level substantially above the top of said cells for wetting and energizing all of the cells, whereupon said discharged gas will displace a major portion of said liquid out of said assembly down through said opening.

4. An assembly as claimed in claim 3, wherein said expansible means comprise a flexible diaphragm.

5. An assembly as claimed in claim 3, wherein said expansible means comprise an elastic diaphragm.

6. In a deferred-action battery assembly, a stack of cells adapted to be energized on wetting and discharging a gas when thus energized, an envelope of flexible waterproof material tightly surrounding the sides of said stack and having an open bottom end and a permanently sealed upper end extending beyond the adjacent upper end of said stack so as to define an initially slack expansible portion, and means within said envelope defining a passage for liquid connecting said open and said sealed ends of the envelope and communicating with all of said cells, whereby expansion of said slack portion by the action of hydrostatic pressure on air trapped in said envelope upon immersion of the assembly in a body of liquid will permit the rapid entry of liquid through said open end and up said passage defining means to a level generally above said upper end of the stack to wet and energize all of said cells, and thereafter said discharged gas will displace a major portion of said liquid out of said envelope down said passage and through said open end to allow normal operation of said battery in a liquid free medium.

7. In a deferred-action battery assembly, a stack of cells adapted to be energized on wetting, an envelope of flexible waterproof material tightly surrounding the sides of said stack and having an open bottom end and a permanently sealed upper end extending beyond the adjacent upper end of said stack so as to define an initially slack expansible portion, and means defining a groove in at least a side of said stack for liquid communication between said ends of the envelope and communicating with all said cells, said slack portion being adapted to be expanded by hydrostatic pressure acting on air trapped in said envelope upon immersion of the assembly in a body of liquid, thereby to increase the internal volume of the envelope so that the trapped air can be accommodated in the expanded slack portion for permitting the liquid to enter said envelope and contact all of the cells in said stack.

References Cited in the file of this patent

UNITED STATES PATENTS

| | | |
|---|---|---|
| 2,669,596 | Nelson | Feb. 16, 1954 |
| 2,806,895 | Dines | Sept. 17, 1957 |